(12) United States Patent
Soh et al.

(10) Patent No.: US 8,988,346 B2
(45) Date of Patent: Mar. 24, 2015

(54) ELECTRONIC CHALKBOARD SYSTEM, CONTROL METHOD THEREOF, AND POINTING DEVICE

(75) Inventors: Byung-seok Soh, Yongin-si (KR); Ho-june Yoo, Seoul (KR); Sang-on Choi, Suwon-si (KR); Yong-wan Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 13/604,715

(22) Filed: Sep. 6, 2012

(65) Prior Publication Data

US 2013/0057471 A1 Mar. 7, 2013

(30) Foreign Application Priority Data

Sep. 6, 2011 (KR) ........................ 10-2011-0089958

(51) Int. Cl.
*G06F 3/033* (2013.01)
*G09G 5/08* (2006.01)
*G06F 3/037* (2013.01)
*G06F 3/0354* (2013.01)

(52) U.S. Cl.
CPC ............ *G06F 3/037* (2013.01); *G06F 3/03545* (2013.01)
USPC ....................................................... 345/157

(58) Field of Classification Search
None
See application file for complete search history.

(56) References Cited

U.S. PATENT DOCUMENTS

| | | |
|---|---|---|
| 2009/0167753 A1 | 7/2009 | Chung |
| 2010/0045636 A1 | 2/2010 | Noguchi et al. |
| 2011/0285672 A1 | 11/2011 | Soh et al. |

FOREIGN PATENT DOCUMENTS

KR 1020110128485 A 11/2011

OTHER PUBLICATIONS

US Non-Final Office Action, dated Sep. 3, 2013, issued by the USPTO in related U.S. Appl. No. 13/114,450.

*Primary Examiner* — Nicholas Lee
(74) *Attorney, Agent, or Firm* — Sughrue Mion, PLLC

(57) ABSTRACT

An electronic chalkboard system, a control method thereof, and a pointing device are provided. The electronic chalkboard system includes a plurality of display panels; a pointing device which calculates coordinate information about a touched position based on a reference signal generated on the display panels when touching a first panel among the display panels; and an image processor which generates a signal differently set with respect to each of the display panels on the display panels to determine the first panel among the display panels and displays an image corresponding to the coordinate information calculated by the pointing device on the first panel.

22 Claims, 7 Drawing Sheets

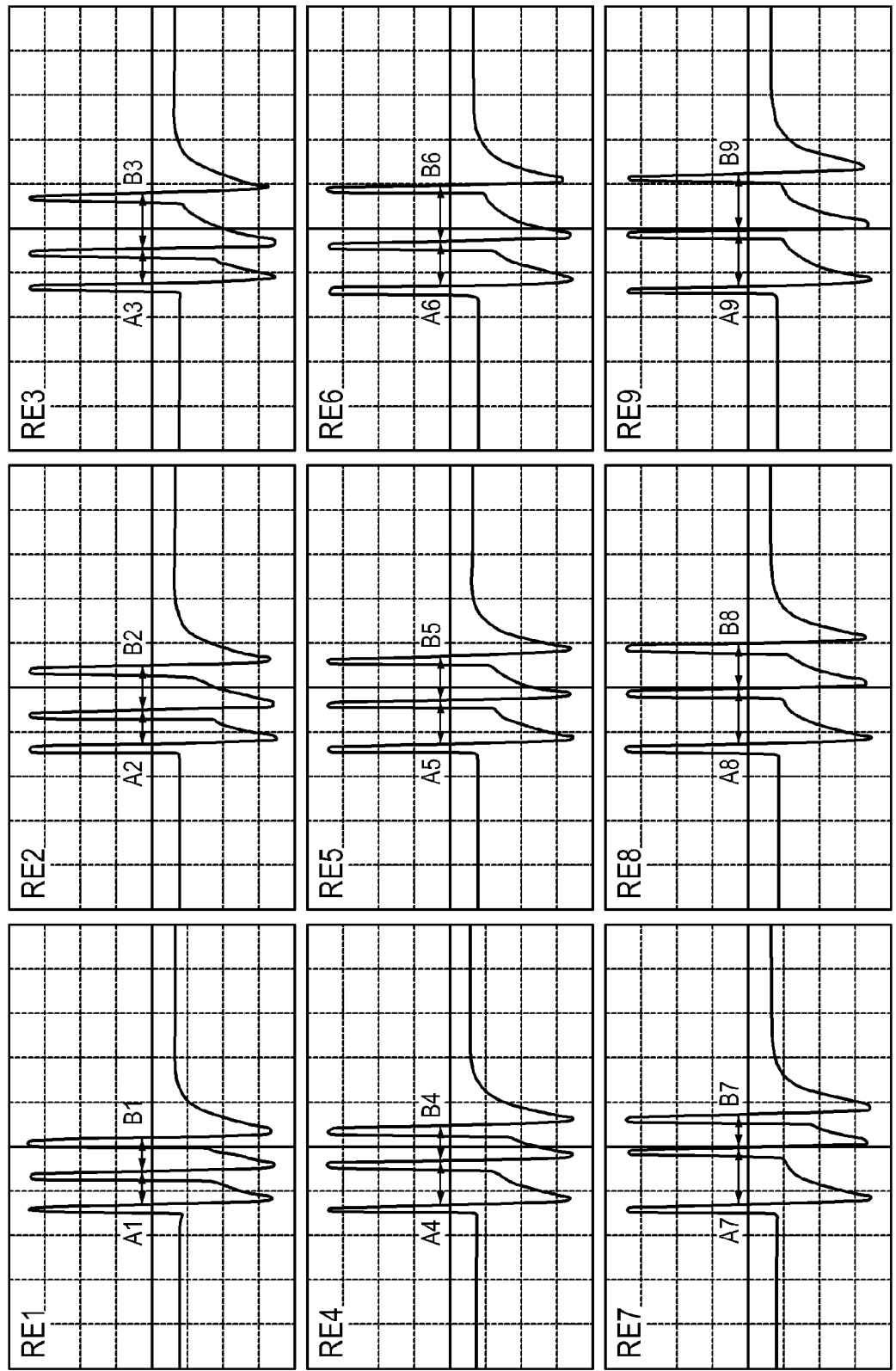

ELECTRONIC CHALKBOARD SYSTEM, CONTROL METHOD THEREOF, AND POINTING DEVICE

CROSS-REFERENCE TO RELATED APPLICATION

This application claims priority from Korean Patent Application No. 10-2011-0089958, filed on Sep. 6, 2011 in the Korean Intellectual Property Office, the disclosure of which is herein incorporated by reference.

BACKGROUND

1. Field

Apparatuses and methods consistent with the exemplary embodiments relate to an electronic chalkboard system, a control method thereof, and a pointing device, and more particularly, to an electronic chalkboard system including a plurality of display panels which determines a display panel touched by a pointing device, a control method thereof, and a pointing device.

2. Description of the Related Art

A display apparatus performs various processes on image signals or image data input from an outside or stored inside, thereby displaying images on a display panel or a screen. The display apparatus may be configured in various types, such as a television (TV), a monitor, a portable media player, or the like. The display apparatus has diverse additional and supplementary functions with technological development. For example, the display apparatus may be configured as an electronic chalkboard system.

An electronic blackboard system detects a trace formed by a pointing device on a panel or a screen and displays an image corresponding to the detected trace on the panel or the screen.

SUMMARY

According to an aspect of an exemplary embodiment, there is provided an electronic chalkboard system including a plurality of display panels; a pointing device which calculates coordinate information about a touched position based on a reference signal generated on the display panels when touching a first panel among the display panels; and an image processor which generates a signal differently set with respect to each of the display panels on the display panels to determine the first panel among the display panels and displays an image corresponding to the coordinate information calculated by the pointing device on the first panel.

The differently set signal may include the reference signal set to have a different waveform for each of the display panels.

The reference signal may include a plurality of pulses and the image processor may set a different pattern of the pulses for each of the display panels.

The image processor may set a different time interval between the pulses for each of the display panels.

The image processor may set different time for which the pulses in the reference signal are a preset voltage level or more for each of the display panels.

The image processor may set a different number of the pulses in the reference signal for each of the display panels.

The pointing device may include a sensor that detects the reference signal; and a controller that determines the first panel among the display panels based on the pattern of the pulses of the reference signal detected by the sensor and transmits identification information about the first panel to the image processor so that the image processor displays an image corresponding to the coordinate information on the first panel.

The image processor may, simultaneously on each display panel, scan a scan signal across the display panels in row and column directions of the display panels after generating the reference signal, and the pointing device may calculate the coordinate information corresponding to a period between detected times of the reference signal and the scan signal.

The reference signal may include an infrared signal.

The display panels may include a plasma display panel (PDP).

According to an aspect of another exemplary embodiment, there is provided a control method of an electronic chalkboard, the method including generating reference signals on a plurality of display panels; detecting the reference signal of a first panel touched by a pointing device when the pointing device touches the first panel among the display panels; calculating coordinate information about a touched position of the pointing device based on the detected reference signal and determining the first panel as corresponding to the touched position based on the detected reference signal; and displaying an image corresponding to the coordinate information on the first panel.

The differently generated signal may include the reference signal set to have a different waveform for each of the display panels.

The reference signal may include a plurality of pulses and a pattern of the pulses may be set differently for each of the display panels.

A time interval between the pulses in the reference signal may be set differently for each of the display panels.

Time for which the pulses in the reference signal are a preset voltage level or more may be set differently for each of the display panels.

A number of the pulses in the reference signal may be set differently for each of the display panels.

According to an aspect of another exemplary embodiment, there is provided a pointing device of an electronic chalkboard system, the pointing device including a communication unit which communicates with an image processor that displays an image on a plurality of display panels; a sensor which detects a reference signal generated on the display panels when touching a first panel among the display panels; a storage unit which stores a profile of the reference signal preset differently for each of the display panels; and a controller which calculates coordinate information about a touched position of the pointing device based on the reference signal, determines that the reference signal detected by the sensor corresponds to the first panel based on the profile stored in the storage unit, and transmits identification information about the first panel and the coordinate information to the communication unit for the image processor to display an image corresponding to the coordinate information on the first panel.

According to an aspect of another exemplary embodiment, there is provided an electronic chalkboard system including: a plurality of display panels; a pointing device which calculates coordinate information about a touched position based on a reference signal generated on the display panels when touching a first panel among the display panels; and an image processor which further generates waveforms of a plurality of signals with respect to the respective display panels to determine the first panel among the display panels and displays an image corresponding to the coordinate information calculated by the pointing device on the first panel.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 7 illustrates an example of a waveform of a reference signal corresponding to each display panel in the electronic chalkboard system of FIG. 1.

DETAILED DESCRIPTION OF EXEMPLARY EMBODIMENTS

Figure 1:
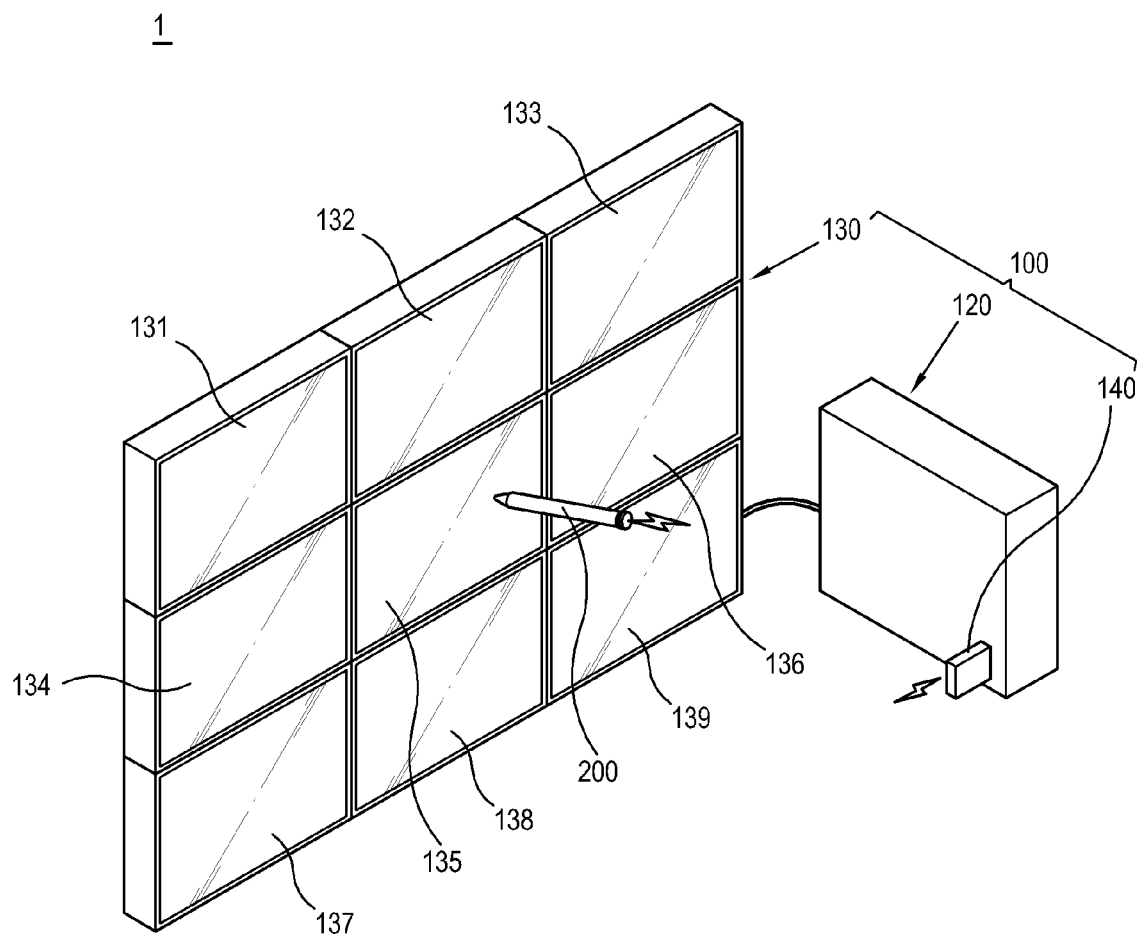
FIG. 1 illustrates an example of an electronic chalkboard system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 illustrates an example of an electronic chalkboard system according to an exemplary embodiment.

As shown in FIG. 1, the electronic chalkboard system 1 according to the present exemplary embodiment includes a display apparatus 100 that displays images and a pointing device 200 that touches a display unit 130 in a position.

The display apparatus 100 may be configured as a TV or computer monitor having the display unit 130, without being limited particularly. However, in the present exemplary embodiment, the display unit 130 includes a plurality of display panels 131, 132, 133, 134, 135, 136, 137, 138 and 139 so that the display apparatus 100 realizes a large-sized screen. The plurality of display panels 131, 132, 133, 134, 135, 136, 137, 138 and 139 are disposed in a matrix array along a wall or standing on the ground.

Although FIG. 1 shows that the display unit 130 includes nine display panels 131, 132, 133, 134, 135, 136, 137, 138 and 139, this display unit is provided for illustrative purposes only. The number of display panels 131, 132, 133, 134, 135, 136, 137, 138 and 139 may be modified variously. Here, each of the display panels 131, 132, 133, 134, 135, 136, 137, 138 and 139 is configured to emit a beacon signal to be sensed by the pointing device 200 that touches the panels.

Further, FIG. 1 shows that an image processor 120 and the display unit 130 are separated from each other in the display apparatus 100. For example, the image processor 120 may be configured as a computer such as a desktop, a laptop, and the like. In addition, the image processor 120 includes a device communication unit 140 configured as a dongle or module to communicate with the pointing device 200.

However, such configuration may be modified. For example, the image processor 120 and the display unit 130 may be accommodated in a single housing (not shown). In this case, the device communication unit 140 may be installed in the housing.

The pointing device 200 is held by a user and used to touch any one of the display panels 131, 132, 133, 134, 135, 136, 137, 138 and 139. Here, the pointing device 200 calculates coordinate information about a position which the pointing device 200 touches on the display panels 131, 132, 133, 134, 135, 136, 137, 138 and 139.

In detail, the pointing device 200 detects a beacon signal emitted by the display panels 131, 132, 133, 134, 135, 136, 137, 138 and 139 and calculates coordinate information corresponding to the position touched by the pointing device 200 on the display panels 131, 132, 133, 134, 135, 136, 137, 138 and 139 based on a detection result. Then, the pointing device 200 transmits the calculated coordinate information wirelessly to the image processor 120 through the device communication unit 140.

Accordingly, when the user touches a position on the display panels 131, 132, 133, 134, 135, 136, 137, 138 and 139 with the pointing device 200, an image corresponding to the touched position is displayed on the display panel 131, 132, 133, 134, 135, 136, 137, 138 and 139 by the image processor 120. Here, the image processor 120 determines a display panel touched by the pointing device 200 among the display panels 131, 132, 133, 134, 135, 136, 137, 138 and 139 and displays the image on the determined display panel.

Figure 2:
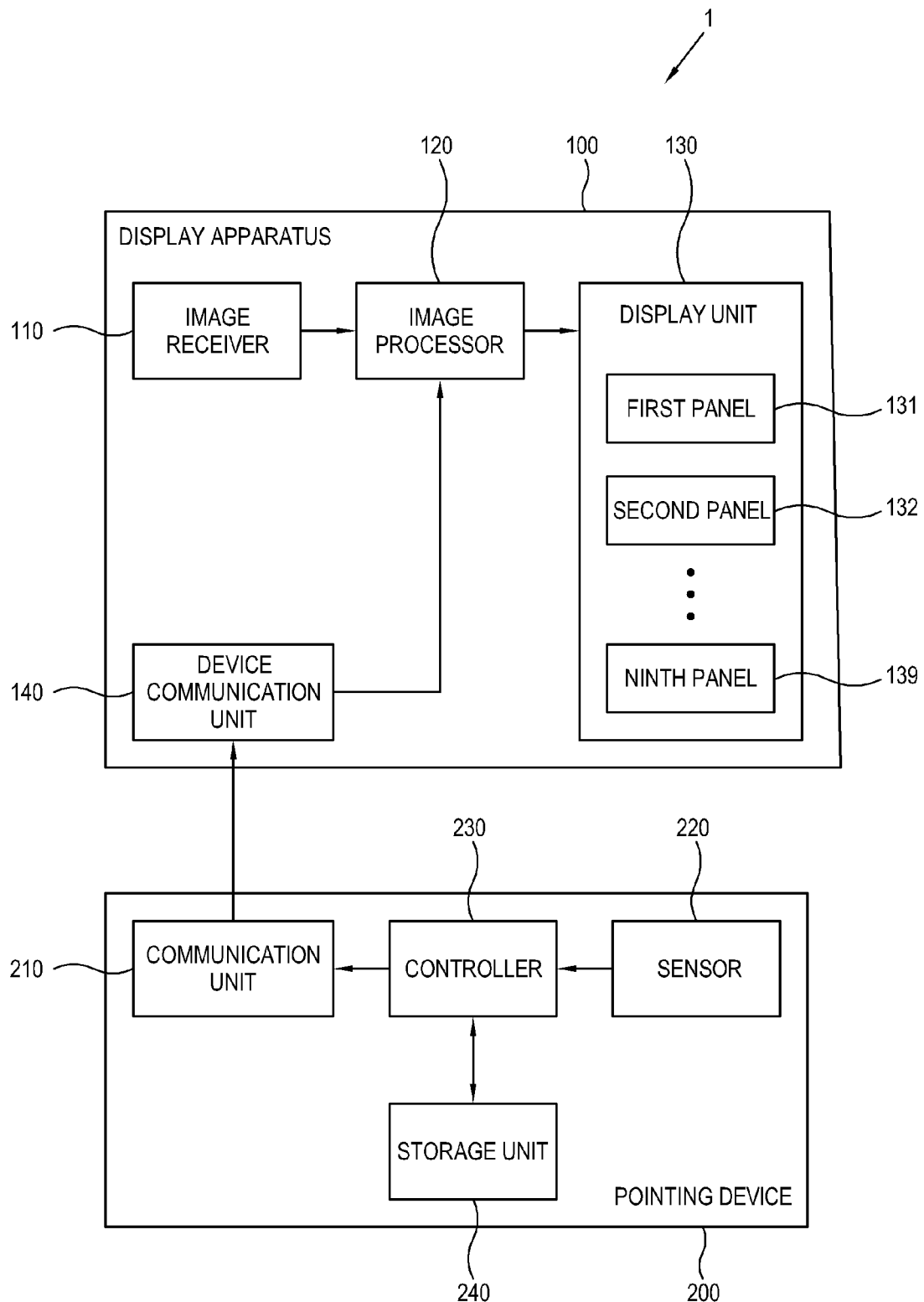
FIG. 2 is a block diagram illustrating a configuration of the electronic chalkboard system of FIG. 1.

Hereinafter, a configuration of the electronic chalkboard system 1 is described in detail with reference to FIG. 2. FIG. 2 is a block diagram illustrating the configuration of the electronic chalkboard system of FIG. 1.

As shown in FIG. 2, the display apparatus 100 according to the present exemplary embodiment includes an image receiver 110 receiving an image signal transmitted from the outside, the image processor 120 processing an image signal received from the image receiver 110 according to a preset image processing process, the display unit 130 including the plurality of display panels 131, 132, 133, 134, 135, 136, 137, 138 and 139 to display an image processed by the image processor 120, and the device communication unit 140 communicating with the pointing device 200.

The pointing device 200 includes a communication unit 210 communicating with the display apparatus 100, a sensor detecting a beacon signal emitted by the display panels 131, 132, 133, 134, 135, 136, 137, 138 and 139 and a controller 230 that calculates coordinate information about a position touched by the pointing device 20 based on a detected time of the beacon signal by the sensor 220 and transmits the calculated coordinate information to the communication unit 210.

Hereinafter, each component of the display apparatus 100 will be described in detail.

The image receiver 110 receives image signals/image data wirelessly or through a wire and transmits the signals/data to the image processor 120. The image receiver 110 may be configured as various types corresponding to standards of received image signals. For example, the image receiver 110 may receive radio frequency (RF) signals or image signals according to composite/component video, super video, SCART, and high definition multimedia interface (HDMI), DisplayPort, unified display interface (UDI), or wireless HD standards.

The image processor 120 performs various preset image processing processes on image signals and outputs processed image signals to the display panels 131, 132, 133, 134, 135, 136, 137, 138 and 139, so that images are displayed on the display panels 131, 132, 133, 134, 135, 136, 137, 138 and 139. The image processor 120 may perform various processes, without being limited, such as decoding corresponding to various image formats, de-interlacing, frame refresh rate conversion, scaling, noise reduction to improve image quality, detail enhancement, and the like.

The image processor 120 generates an image corresponding to coordinate information transmitted through the device communication unit 140, for example, an image displaying a line or point corresponding to the coordinate information, and displays the image on the display panels 131, 132, 133, 134, 135, 136, 137, 138 and 139. The image processor 120 may be configured as a computer including a main board (not shown) equipped with a CPU (not shown), a graphic card (not shown), a storage medium (not shown) and other optical cards (not shown), without being limited thereto.

Further, the image processor 120 controls a beacon signal to be emitted in the display panels 131, 132, 133, 134, 135, 136, 137, 138 and 139 in a preset mode according to a preset time. An illustrative example of the image processor 120 controlling emission of a beacon signal will be described later.

The display unit 130 includes the plurality of display panels 131, 132, 133, 134, 135, 136, 137, 138 and 139. The display panels 131, 132, 133, 134, 135, 136, 137, 138 and 139 display an image based on an image signal output from the image processor 120 thereon. In the present exemplary embodiment, the display panels 131, 132, 133, 134, 135, 136, 137, 138 and 139 are configured as a plasma display panel (PDP). The display panels 131, 132, 133, 134, 135, 136, 137, 138 and 139 in the PDP type emit an infrared signal on each panel, and the infrared signal is used as a beacon signal detected by the pointing device 200.

The device communication unit 140 communicates wirelessly with the pointing device 200 and transmits data received from the pointing device 200, for example, coordinate information, to the image processor 120. The device communication unit 140 may receive data based on a RF communication standard, such as ZigBee, and receives coordinate information from the pointing device 200 through a particular frequency band, that is, a preset wireless communication channel.

Hereinafter, each component of the pointing device 200 is described in detail.

The communication unit 210 converts coordinate information calculated by the controller 230 in accordance with a preset wireless protocol and transmits the coordinate information to the device communication unit 140.

The sensor 220 is installed on one outside end portion of the pointing device 200. When the pointing device 200 touches a position on the display panels 131, 132, 133, 134, 135, 136, 137, 138 and 139, the sensor 220 detects a beacon signal emitted in the touched position. The sensor 220 is configured based on characteristics of a beacon signal. For example, when a beacon signal is an infrared signal, the sensor 220 is configured as an infrared photo-detector to detect the infrared signal.

The controller 230 calculates coordinate information about a position that is touched by the pointing device 200 based on detected time of a beacon signal by the sensor 220. The controller 230 transmits the calculated coordinate information to the communication unit 120.

With this configuration, the pointing device 200 detects a beacon signal on any one of the display panels 131, 132, 133, 134, 135, 136, 137, 138 and 139. The pointing device 200 calculates coordinate information about a touched position on the corresponding display panels 131, 132, 133, 134, 135, 136, 137, 138 and 139 based on the detected beacon signal and transmits the calculated coordinate information to the image processor 120, so that an image corresponding to the coordinate information is displayed on the display panels 131, 132, 133, 134, 135, 136, 137, 138 and 139.

Figure 3:
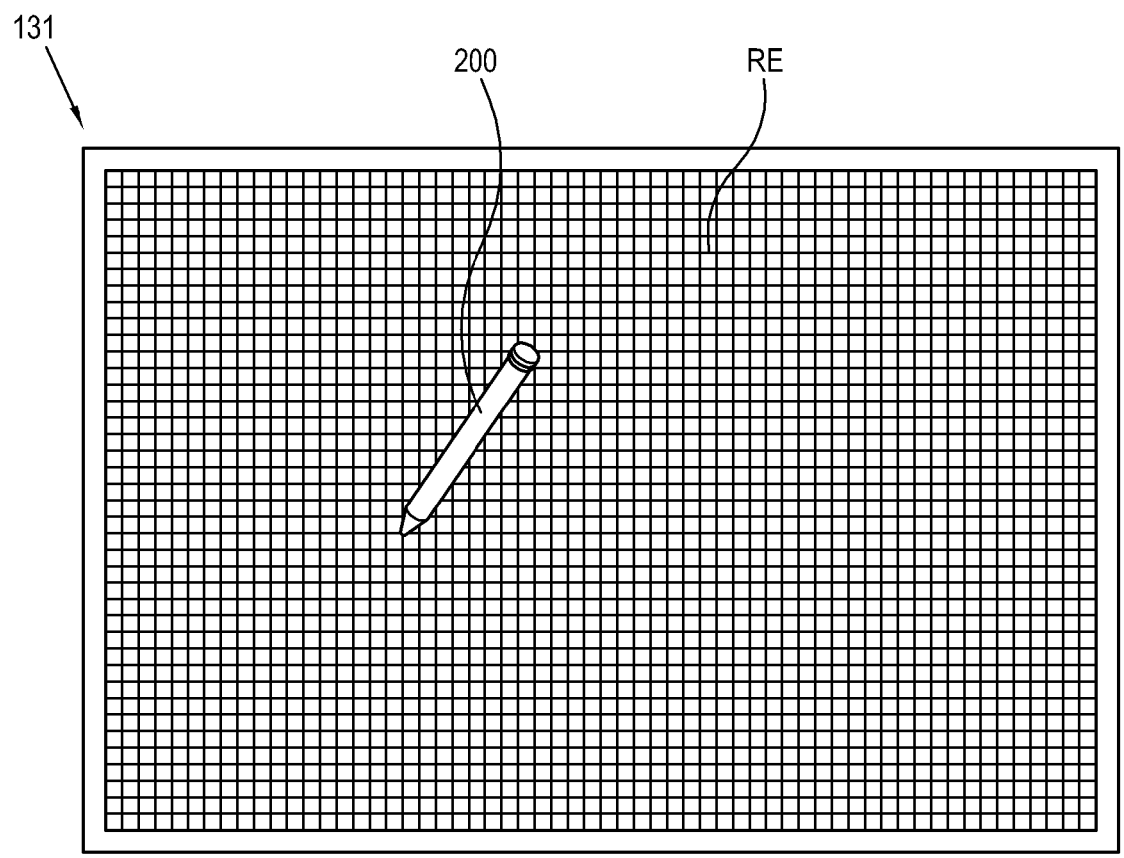
FIG. 3 illustrates an example of scanning a reference signal for one display panel in the electronic chalkboard system of FIG. 1.
Figure 4:
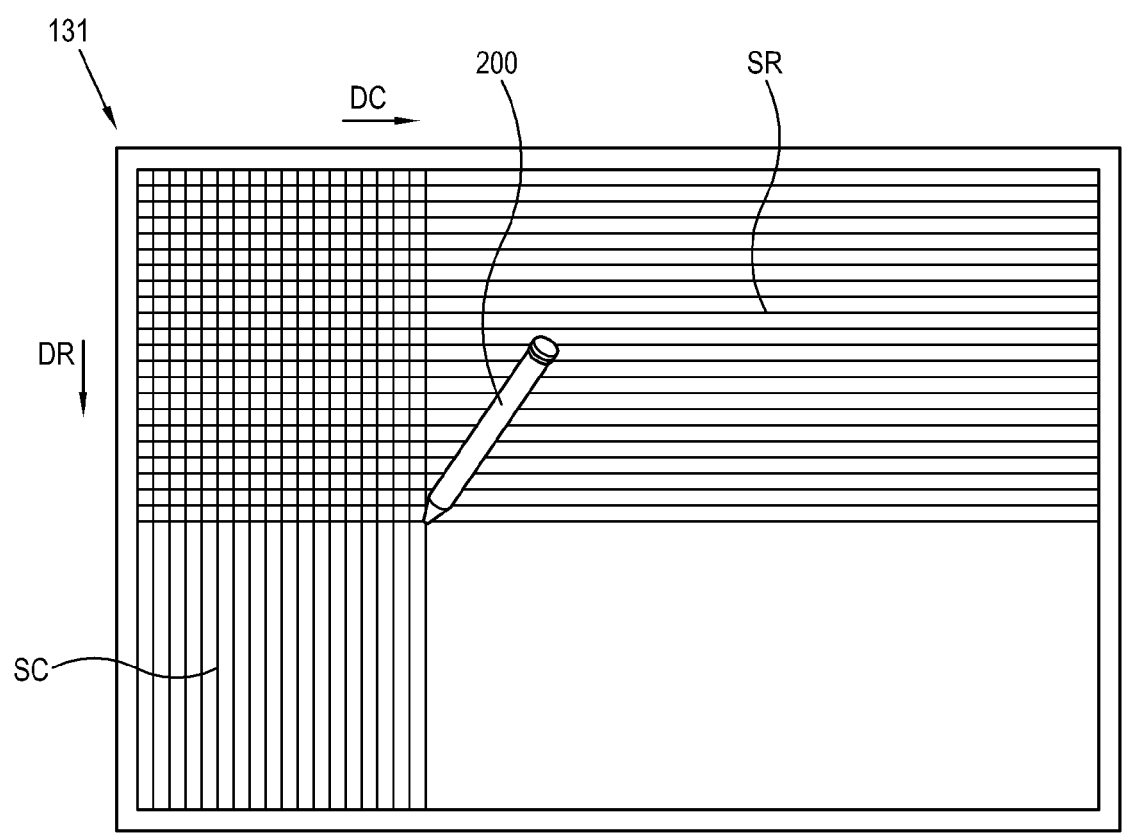
FIG. 4 illustrates an example of sequentially scanning scan signals for one display panel in row and column directions in the electronic chalkboard system of FIG. 1.

Here, when the pointing device 200 touches a first panel 131 among the display panels 131, 132, 133, 134, 135, 136, 137, 138 and 139, a process that the pointing device 200 uses to calculate coordinate information on the first panel 131 is performed. This process is described in detail with reference to FIGS. 3 and 4. FIG. 3 illustrates that reference signals RE are output onto the first panel 131, and FIG. 4 illustrates scan signals are sequentially scanned onto the first panel 131.

Here, the reference signals RE and the scanning signals SR and SC are included in a beacon signal, which is controlled to be emitted in a preset mode by the image processor 120 onto the display panels 131, 132, 133, 134, 135, 136, 137, 138 and 139. The reference signals RE and the scanning signals SR and SC will be described in detail.

As shown in FIG. 3, the image processor 120 generates beacon signals like a net on the entire first panel 131, and the pointing device 200 is brought into contact with the first panel 131. The beacon signals output in this manner are referred to as reference signals RE.

Since the reference signals RE are generated on the entire first panel 131, the pointing device 200 detects a reference signal RE when touching any position in an effective area of the first panel 131.

The controller 230 of the pointing device 200 starts counting time at a point when the sensor 220 detects a reference signal RE.

As shown in FIG. 4, the image processor 120 sequentially scans lines SR and SC of the beacon signals onto the first panel 131 by a preset unit period in row and column directions DR and DC of the first panel 131 after emitting the reference signals RE, shown in FIG. 3. The beacon signals output in this manner are referred to as scan signals SR and SC.

First, the image processor 120 sequentially scans horizontal lines SR of scan signals in the row direction DR from a top edge of the first panel 131 to a bottom edge after generating the reference signals RE. In the meantime, the sensor 220 of the pointing device 200 detects the scan signals SR at a position touched by the pointing device 200.

After completely scanning the horizontal lines SR of the scan signals to the bottom edge of the first panel 131, the image processor 120 sequentially scans vertical lines SC of the scan signals in the column direction DC from a left edge of the first panel 131 to a right edge. In the meantime, the sensor 220 detects the scan signals SC at the position touched by the pointing device 200.

The controller 230 calculates periods among detected times of the reference signals RE, the scan signals SR and the scan signals SC and calculates coordinate information about the pointing device 200 corresponding to the calculated intervals. That is, the controller 230 calculates time differences between detected times of the scan signals SR and SC based on the reference signals RE, thereby obtaining information about x and y coordinates of the touched position by the pointing device 200 on the first panel 131.

In order to readily obtain the coordinate information, the controller 230 may pre-store a formula or algorithm to calculate coordinate information by substituting a table including coordinate information corresponding to detected times or by substituting detected times.

In the present exemplary embodiment, the scan signals SR are scanned in the row direction DR, and then the scan signals SC are scanned in the column direction DC. Alternatively, the scan signals SC may be scanned in the column direction DC, and then the scan signals SR are scanned in the row direction DR.

The above exemplary embodiment describes a method of obtaining coordinate information on one panel, the first panel 131, among the display panels 131, 132, 133, 134, 135, 136, 137, 138 and 139. When the display unit 130 includes the plurality of display panels 131, 132, 133, 134, 135, 136, 137, 138 and 139 according to the present exemplary embodiment, the reference signals RE and the scan signals SR and SC are scanned onto the respective display panels 131, 132, 133, 134, 135, 136, 137, 138 and 139 at the same time. That is, the image processor 120 simultaneously scans the reference signals RE onto the display panels 131, 132, 133, 134, 135, 136, 137, 138 and 139, then scans the scan signals SR onto the display panels, then scans the scan signals SC onto the display panels.

Here, in order that the image processor 120 displays an image corresponding to coordinate information on the display panels 131, 132, 133, 134, 135, 136, 137, 138 and 139, the image processor 120 determines a display panel to display the corresponding image on among the display panels 131, 132, 133, 134, 135, 136, 137, 138 and 139, that is, a display panel touched by the pointing device 200 among the display panels 131, 132, 133, 134, 135, 136, 137, 138 and 139.

Namely, the pointing device 200 may determine which display panel corresponds to the calculated coordinate information among the display panels 131, 132, 133, 134, 135, 136, 137, 138 and 139.

Accordingly, the electronic chalkboard system 1 according to the present exemplary embodiment determines which display panel is touched by the pointing device 200 among the display panels 131, 132, 133, 134, 135, 136, 137, 138 and 139 as follows.

First, the image processor 120 of the display apparatus 100 generates different waveforms of reference signals RE with respect to the respective display panels 131, 132, 133, 134, 135, 136, 137, 138 and 139. The controller 230 of the pointing device 200 includes a storage unit 240 (see FIG. 2) storing profiles of waveforms of preset reference signals RE corresponding to the respective display panels 131, 132, 133, 134, 135, 136, 137, 138 and 139.

The controller 230 analyses a waveform of a reference signal RE detected by the sensor 220 and compares the waveform with the profiles of the waveforms stored in the storage unit 240, thereby determining which display panel corresponds to the corresponding reference signal RE among the display panels 131, 132, 133, 134, 135, 136, 137, 138 and 139. Then, the controller 230 provides, to the image processor 120, identification information about the corresponding display panel configured to be identified by the image processor 120 along with coordination information.

The image processor 120 selects one of the display panels 131, 132, 133, 134, 135, 136, 137, 138 and 139 based on the identification information and displays an image corresponding to the coordinate information on the selected display panel.

In this process, the electronic chalkboard system 1 determines which display panel is touched by the pointing device 200 among the display panels 131, 132, 133, 134, 135, 136, 137, 138 and 139 and displays an image corresponding to coordinate information on the determined display panel.

Figure 5:
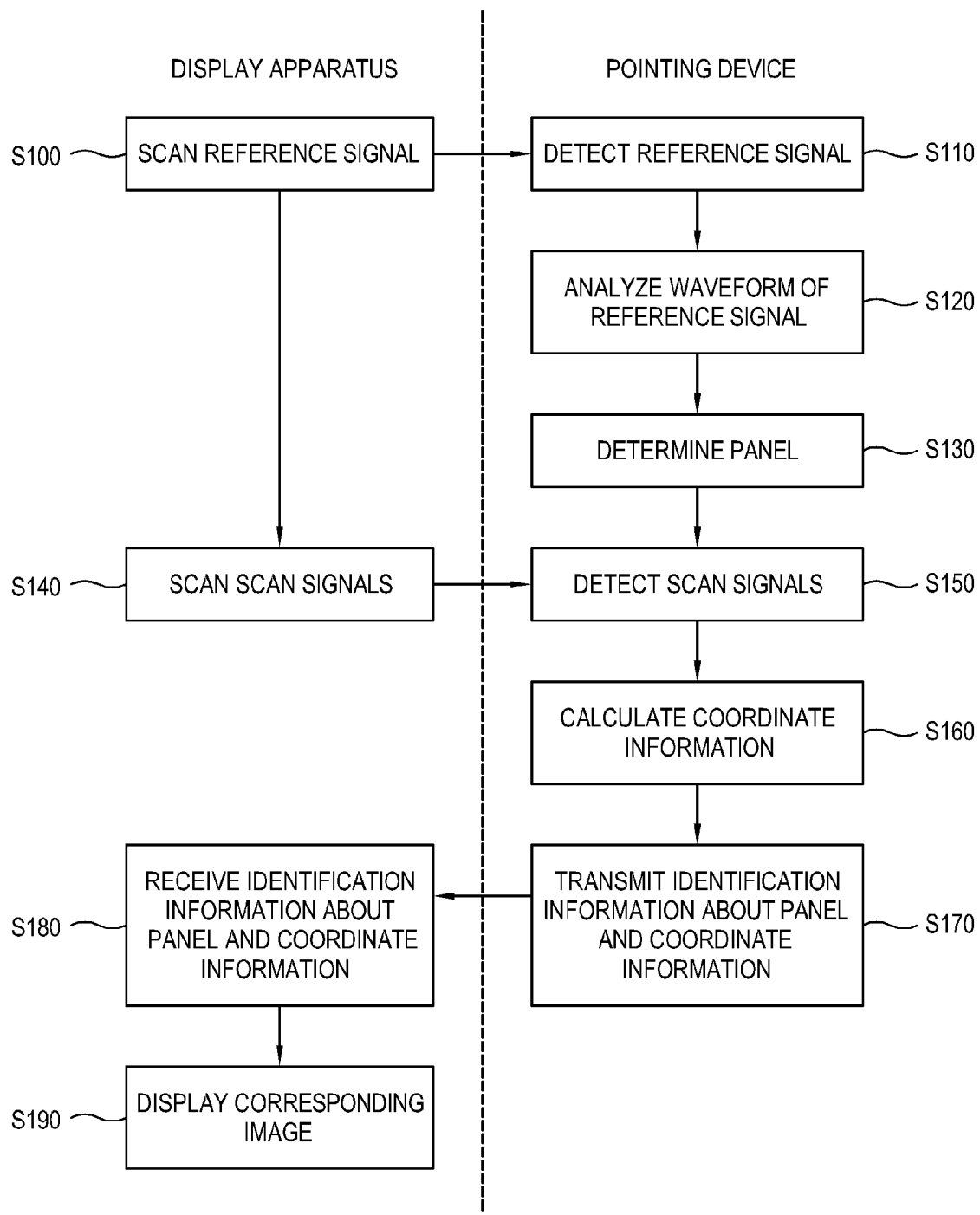
FIG. 5 is a flowchart illustrating a process of displaying an image corresponding to a touched position by a pointing device on a particular display panel in the electronic chalkboard system of FIG. 1.

Hereinafter, a process of displaying an image corresponding to a position touched by the pointing device 200 on a particular display panel among the display panels 131, 132, 133, 134, 135, 136, 137, 138 and 139 in the electronic chalkboard system 1 is described with reference to FIG. 5. FIG. 5 is a flowchart illustrating the process.

As shown in FIG. 5, the image processor 120 transmits a reference signal RE to the display panels 131, 132, 133, 134, 135, 136, 137, 138 and 139 (S100), and the pointing device 200 is made to touch the first panel 131 at a position among the display panels 131, 132, 133, 134, 135, 136, 137, 138 and 139.

The sensor 220 detects the reference signal RE (S110). The controller 230 analyzes a waveform of the reference signal RE (S120) and determines the first panel 131 corresponding to the analyzed waveform among the profiles of waveforms of the display panels 131, 132, 133, 134, 135, 136, 137, 138 and 139 (S130).

The image processor 120 scans scan signals SR and SC at preset intervals after scanning the reference signal RE (S140).

The sensor 220 detects the scan signals SR and SC (S150). The controller 230 calculates coordinate information corresponding to the touched position by the pointing device 200 on the first panel 131 based on detected times of the reference signal RE and the scan signals SR and SC (S160). The controller 230 transmits identification information about the first panel 131 and the coordinate information to the display apparatus 100 (S170).

The image processor 120 receives the identification information about the first panel 131 and the coordinate information (S180). The image processor 120 selects the first panel 131 corresponding to the received identification information among the display panels 131, 132, 133, 134, 135, 136, 137, 138 and 139. Then, the image processor 120 displays an image corresponding to the coordinate information on the first panel 131 (S190).

In accordance with this process, the electronic chalkboard system 1 according to the present exemplary embodiment may display a corresponding image on a display panel touched by the pointing device 200 among the display panels 131, 132, 133, 134, 135, 136, 137, 138 and 139.

Figure 6:
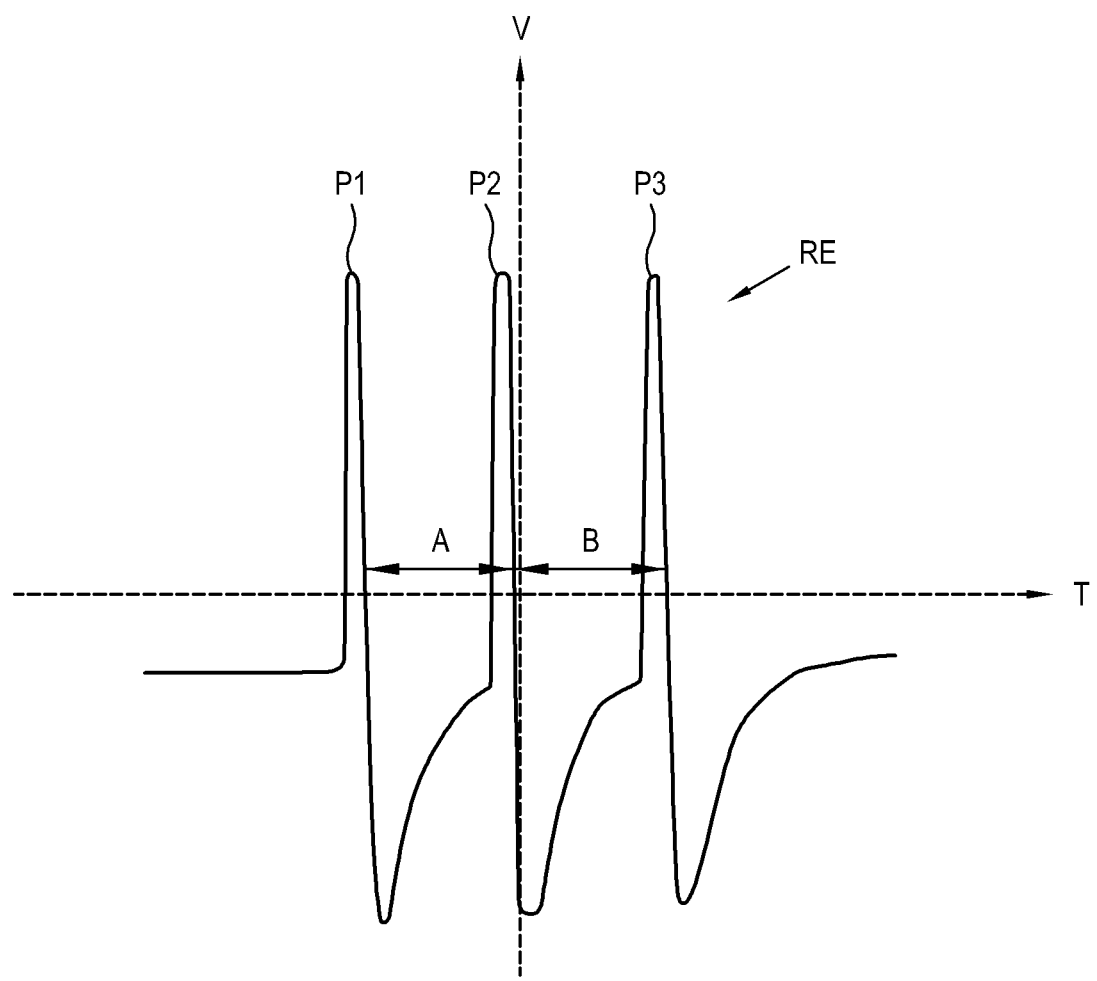
FIG. 6 illustrates an example of a waveform of a reference signal in the electronic chalkboard system of FIG. 1.

In the exemplary embodiment described above, different waveforms of reference signals RE are set for the respective display panels 131, 132, 133, 134, 135, 136, 137, 138 and 139, thereby allowing for the selection of a display panel touched by the pointing device 200 among the display panels 131, 132, 133, 134, 135, 136, 137, 138 and 139. Here, various methods of setting a waveform of a reference signal RE may be applied. Hereinafter, an illustrative composition of a reference signal RE is described with reference to FIG. 6. FIG. 6 illustrates an example of a waveform of a reference signal RE.

As shown in FIG. 6, the image processor 120 outputs an image signal to the display unit 130, and allows to include a reference signal RE and scan signals SR and SC in a subfield in the image signal, thereby scanning the reference signal RE and the scan signals SR and SC to the display panels 131, 132, 133, 134, 135, 136, 137, 138 and 139.

On a graph of time (T) on a horizontal axis against voltage (V) on a vertical axis in FIG. 6, the reference signal RE includes three pulses P1, P2 and P3. However, these three pulses P1, P2 and P3 of the reference signal RE are provided for illustrative purposes only and are not to be in any way construed as limiting the present invention. The number of pulses P1, P2 and P3 may be modified freely.

The image processor 120 sets different patterns of the pulses P1, P2 and P3 by the respective display panels 131, 132, 133, 134, 135, 136, 137, 138 and 139. For example, when the plurality of pulses P1, P2 and P3 in the reference signal RE are chronologically referred to as P1, P2 and P3, respectively, a time interval between pulses P1 and P2 is defined as A, and a time interval between pulses P2 and P3 is defined as B, each of A and B is adjusted to set different waveforms of reference signals RE by the respective display panels 131, 132, 133, 134, 135, 136, 137, 138 and 139.

Here, A and B may indicate a value between falling times of the respective pulses (P1, P2 and P3) from a preset voltage value or may indicate a value between rising times of the respective pulses (P1, P2 and P3) from the preset voltage value.

According to this principle, an example of setting waveforms of reference signals RE1, RE2, RE3, RE4, RE5, RE6, RE7, RE8 and RE9 corresponding to the nine display panels 131, 132, 133, 134, 135, 136, 137, 138 and 139, respectively, is described with reference to FIG. 7 as follows. FIG. 7 shows illustrative waveforms of reference signals RE1, RE2, RE3, RE4, RE5, RE6, RE7, RE8 and RE9 by the respective display panels 131, 132, 133, 134, 135, 136, 137, 138 and 139.

FIG. 7 shows a graph illustrating the waveforms of the reference signals RE1, RE2, RE3, RE4, RE5, RE6, RE7, RE8 and RE9 corresponding to the nine display panels 131, 132, 133, 134, 135, 136, 137, 138 and 139, respectively, wherein each of the reference signals RE1, RE2, RE3, RE4, RE5, RE6, RE7, RE8 and RE9 includes three pulses.

Intervals among pulses by the reference signals RE1, RE2, RE3, RE4, RE5, RE6, RE7, RE8 and RE9 may be set in combination of three values, for example, 30 µsec, 40 µsec and 50 µsec, as follows, so that the reference signals RE1, RE2, RE3, RE4, RE5, RE6, RE7, RE8 and RE9 may have nine patterns overall. Here, the aforementioned values are illustrative examples only, without being particularly limited.

In the case of a reference signal RE1 corresponding to the first panel 131 among the plurality of display panels 131, 132, 133, 134, 135, 136, 137, 138 and 139, an interval A1 between a first pulse and a second pulse is set to 30 µsec and an interval B1 between the second pulse and a third pulse is set to 30 µsec.

In the case of a reference signal RE2 corresponding to a second panel 132 among the plurality of display panels 131, 132, 133, 134, 135, 136, 137, 138 and 139, an interval A2 between a first pulse and a second pulse is set to 30 µsec and an interval B2 between the second pulse and a third pulse is set to 40 µsec.

In the case of a reference signal RE3 corresponding to a third panel 133 among the plurality of display panels 131, 132, 133, 134, 135, 136, 137, 138 and 139, an interval A3 between a first pulse and a second pulse is set to 30 µsec and an interval B3 between the second pulse and a third pulse is set to 50 µsec.

In the case of a reference signal RE4 corresponding to a fourth panel 134 among the plurality of display panels 131, 132, 133, 134, 135, 136, 137, 138 and 139, an interval A4 between a first pulse and a second pulse is set to 40 µsec and an interval B4 between the second pulse and a third pulse is set to 30 µsec.

In the case of a reference signal RE5 corresponding to a fifth panel 135 among the plurality of display panels 131, 132, 133, 134, 135, 136, 137, 138 and 139, an interval A5 between a first pulse and a second pulse is set to 40 µsec and an interval B5 between the second pulse and a third pulse is set to 40 µsec.

In the case of a reference signal RE6 corresponding to a sixth panel 136 among the plurality of display panels 131, 132, 133, 134, 135, 136, 137, 138 and 139, an interval A6 between a first pulse and a second pulse is set to 40 µsec and an interval B6 between the second pulse and a third pulse is set to 50 µsec.

In the case of a reference signal RE7 corresponding to a seventh panel 137 among the plurality of display panels 131, 132, 133, 134, 135, 136, 137, 138 and 139, an interval A7 between a first pulse and a second pulse is set to 50 µsec and an interval B7 between the second pulse and a third pulse is set to 30 µsec.

In the case of a reference signal RE8 corresponding to an eighth panel 138 among the plurality of display panels 131, 132, 133, 134, 135, 136, 137, 138 and 139, an interval A8 between a first pulse and a second pulse is set to 50 µsec and an interval B8 between the second pulse and a third pulse is set to 40 µsec.

In the case of a reference signal RE9 corresponding to a ninth panel 139 among the plurality of display panels 131, 132, 133, 134, 135, 136, 137, 138 and 139, an interval A9 between a first pulse and a second pulse is set to 50 µsec and an interval B9 between the second pulse and a third pulse is set to 50 µsec.

In this manner, different waveforms of the reference signals RE1, RE2, RE3, RE4, RE5, RE6, RE7, RE8 and RE9 may be set by the respective display panels 131, 132, 133, 134, 135, 136, 137, 138 and 139.

In addition, there are various ways of setting different waveforms of a reference signal. For example, since time with respect to a single reference signal is the same in all of the display panels 131, 132, 133, 134, 135, 136, 137, 138 and 139, time for which a plurality of pulses in the reference signal is a preset voltage level or more may be set differently by the respective display panels 131, 132, 133, 134, 135, 136, 137, 138 and 139.

Alternatively, the number of pulses in the reference signal may be modified differently by the display panels 131, 132, 133, 134, 135, 136, 137, 138 and 139. That is, a first panel may have a waveform of two pulses, a second panel may have a waveform of three pulses, a fourth panel may have a waveform of four pulses, and so on.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An electronic chalkboard system comprising:
    a plurality of display panels;
    a pointing device which calculates coordinate information about a touched position based on a reference signal generated on the display panels when the pointing device touches a first panel among the display panels; and
    an image processor which generates a signal that is differently set with respect to each of the display panels on the display panels to determine the first panel among the display panels and displays an image corresponding to the coordinate information calculated by the pointing device on the first panel.

2. The electronic chalkboard system of claim 1, wherein the differently set signal comprises the reference signal set to have a different waveform for each of the display panels.

3. The electronic chalkboard system of claim 2, wherein the reference signal comprises a plurality of pulses, and the image processor sets a different pattern of the pulses for each of the display panels.

4. The electronic chalkboard system of claim 3, wherein the image processor sets a different time interval between the pulses for each of the display panels.

5. The electronic chalkboard system of claim 3, wherein the image processor sets a different time for which the pulses in the reference signal are a preset voltage level or more for each of the display panels.

6. The electronic chalkboard system of claim 3, wherein the image processor sets a different number of the pulses of the reference signal for each of the display panels.

7. The electronic chalkboard system of claim 3, wherein the pointing device comprises:
a sensor which detects the reference signal; and
a controller which determines the first panel among the display panels based on the pattern of the pulses of the reference signal detected by the sensor, and transmits identification information about the first panel to the image processor so that the image processor displays an image corresponding to the coordinate information on the first panel.

8. The electronic chalkboard system of claim 3, wherein the image processor simultaneously scans a scan signal across each of the display panels in row and column directions of the display panels after generating the reference signal, and the pointing device calculates the coordinate information corresponding to a period between detected times of the reference signal and the scan signal of the display panel that the pointing device is touching.

9. The electronic chalkboard system of claim 1, wherein the reference signal comprises an infrared signal.

10. The electronic chalkboard system of claim 1, wherein the display panels comprise a plasma display panel.

11. A control method of an electronic chalkboard, the method comprising:
generating reference signals on a plurality of display panels, wherein the reference signals are set differently for each of the display panels;
detecting a reference signal of a first panel of the plurality of display panels by a pointing device when the pointing device touches the first panel;
calculating coordinate information about a touched position of the pointing device based on the detected reference signal and determining the first panel as corresponding to the touched position based on the detected reference signal; and
displaying an image corresponding to the coordinate information on the first panel.

12. The control method of claim 11, wherein the reference signal is set to have a different waveform for each of the display panels.

13. The control method of claim 12, wherein the reference signal comprises a plurality of pulses, and a pattern of the pulses is set differently for each of the display panels.

14. The control method of claim 13, wherein a time interval between the pulses in the reference signal is set differently for each of the display panels.

15. The control method of claim 13, wherein a time for which the pulses in the reference signal are a preset voltage level or more is set differently for each of the display panels.

16. The control method of claim 13, wherein a number of the pulses in the reference signal is set differently for each of the display panels.

17. A pointing device of an electronic chalkboard system, the pointing device comprising:
a communication unit which communicates with an image processor that displays an image on a plurality of display panels;
a sensor which detects a reference signal generated on the display panels when the pointing device touches a first panel among the display panels;
a storage unit which stores a profile of the reference signal preset differently for each of the display panel; and
a controller which calculates coordinate information about a touched position of the pointing device based on the reference signal, determines that the reference signal detected by the sensor corresponds to the first panel based on the profile stored in the storage unit, and transmits identification information about the first panel and the coordinate information to the communication unit for the image processor to display an image corresponding to the coordinate information on the first panel.

18. An electronic chalkboard system comprising:
a plurality of display panels;
a pointing device which calculates coordinate information about a touched position based on a reference signal generated on the display panels when touching a first panel among the display panels; and
an image processor which further generates waveforms of a plurality of signals with respect to the respective display panels to determine the first panel among the display panels and displays an image corresponding to the coordinate information calculated by the pointing device on the first panel.

19. An electronic chalkboard system comprising:
a plurality of display panels;
an image processor which generates reference signals on the display panels, each display panel having a different reference signal displayed thereon; and
a pointing device which senses a reference signal of a display panel which the pointing device touches, uses the reference signal to identify the display panel being touched among the display panels, and calculates coordinate information about a touched position using the reference signal,
wherein the image processor displays an image corresponding to the coordinate information calculated by the pointing device on the identified display panel.

20. The electronic chalkboard system of claim 19, wherein the reference signal comprises a plurality of pulses, and the image processor sets a different pattern of the pulses for each of the display panels.

21. The electronic chalkboard system of claim 20, wherein the image processor, after generating the reference signals on the display panels, scans scan signals across the display panels in row and column directions, and
the pointing device senses the scan signals, and calculates the coordinate information based on the sensed scan signals and the sensed reference signal.

22. The electronic chalkboard system of claim 21, wherein the pointing device calculates the coordinate information based on a relative timing between the sensing of the reference signal and the sensing of the scan signals.

* * * * *